UNITED STATES PATENT OFFICE.

LAMBERT THORP, OF DETROIT, MICHIGAN.

PROCESS OF FORMING METHYL ESTER OF ACETYL SALICYLIC ACID.

1,255,950. Specification of Letters Patent. Patented Feb. 12, 1918.

No Drawing. Application filed August 21, 1916. Serial No. 116,180.

*To all whom it may concern:*

Be it known that I, LAMBERT THORP, a citizen of the United States of America, residing at Detroit, in the county of Wayne and State of Michigan, have invented certain new and useful Improvements in Processes of Forming Methyl Ester of Acetyl Salicylic Acid, of which the following is a specification.

The invention relates to the manufacture of the methyl ester of acetyl salicylic acid, and comprises the novel method as hereinafter set forth.

In carrying out my improved method, methyl salicylate and acetic anhydrid are mixed, in the general ratio of one equivalent of methyl salicylate to one and one-half equivalents of acetic anhydrid, but preferably with about 10 per cent. excess of the acetic anhydrid. That is to say, the general ratio of the methyl salicylate to the acetic anhydrid will be 10 to 15 but preferably the proportions will be 10 to 16.5, giving a considerable excess of the cheaper material. I have discovered that the reaction is greatly facilitated by the use of a catalyzing agent, preferably an alkaline acetate, such for instance as anhydrous sodium acetate. Other catalyzers may, however, be substituted, such for instance as zinc chlorid or sulfuric acid.

The materials are mixed at ordinary temperature and are then heated to 95° C., and for a period of preferably from ten to twenty hours, resulting in the formation of a homogeneous mass, the reaction being as follows:

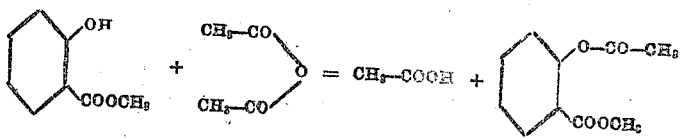

To separate the product, alcohol is added to the solution, preferably in the ratio of eleven parts by weight of alcohol to ten parts by weight of the methyl salicylate. This exact proportion is not, however, absolutely essential. To the solution thus obtained hot water is then added until a faint, permanent turbidity results. After cooling, the product may be separated by filtration.

What I claim as my invention is:

1. The process of forming the methyl ester of acetyl salicylic acid, comprising the mixing of methyl salicylate and acetic anhydrid in the presence of an alkali metal acetate as a catalyzing agent.

2. The process of forming the methyl ester of acetyl salicylic acid, comprising the mixing of methyl salicylate and acetic anhydrid in the presence of an alkali metal acetate catalyzing agent, heating the materials and precipitating the product with dilute alcohol.

3. The process of forming the methyl ester of acetyl salicylic acid, comprising the mixing of methyl salicylate and acetic anhydrid in the general ratio of one equivalent of methyl salicylate to slightly more than one equivalent of acetic anhydrid, adding an alkali metal acetate as catalyzing agent, heating the materials to a temperature between 90° and 100° C. for from ten to twenty hours, adding alcohol and subsequently adding hot water until a slight permanent turbidity is attained, cooling the solution and separating the product by filtration.

In testimony whereof I affix my signature.

LAMBERT THORP.